United States Patent [19]
Lindenfeld et al.

[11] 3,741,343
[45] June 26, 1973

[54] LUBRICATION SYSTEM FOR A DIFFERENTIAL

[75] Inventors: John A. Lindenfeld, St. Joseph, Mich.; Cledith L. Hartz, South Bend, Ind.; Noah A. Shealy, Niles, Mich.

[73] Assignee: Clark Equipment Company, Buchanan, Mich.

[22] Filed: Apr. 29, 1971

[21] Appl. No.: 138,514

[52] U.S. Cl. ............ 184/11 A, 184/6.12, 192/113 B
[51] Int. Cl. .............................................. F16n 7/16
[58] Field of Search ................ 192/113 B; 184/6.12, 184/11, 11 A, 13 R; 74/710.5, 711

[56] References Cited
UNITED STATES PATENTS

| | | | |
|---|---|---|---|
| 3,042,145 | 7/1962 | Bixby | 184/6.12 |
| 3,138,222 | 6/1964 | Dames et al. | 184/11 A |
| 3,474,888 | 10/1969 | Carlson et al. | 192/113 B |
| 3,448,635 | 6/1969 | Nelson | 184/6.12 X |
| 3,590,954 | 7/1971 | Plantan | 184/6.12 |
| 2,935,889 | 5/1960 | Adams et al. | 192/113 B X |

*Primary Examiner*—Manuel A. Antonakas
*Attorney*—Kenneth C. Witt, John C. Wiessler, Robert H. Johnson, Lewis J. Lamm and Robert J. Norton

[57] ABSTRACT

A differential having a lubrication system for supplying lubricant to the interior of the rotating differential carrier both at high and low rotative speeds. An axleway is provided in the carrier along its axis of rotation and a first bore forms that portion of the axleway adjacent the carrier's inner cavity. Cups are provided around the carrier's exterior and fluid passages extend radially through the carrier from these cups into the axleway to a radius less than the radius of the first bore.

13 Claims, 3 Drawing Figures

INVENTORS
NOAH A. SHEALY
JOHN A. LINDENFELD
BY CLEDITH L. HARTZ

ATTORNEY

INVENTORS
NOAH A. SHEALY
JOHN A. LINDENFELD
BY CLEDITH L. HARTZ

ATTORNEY

LUBRICATION SYSTEM FOR A DIFFERENTIAL

BACKGROUND OF THE INVENTION

This invention relates to the lubrication of differential mechanisms such as are employed in vehicle final drives to divide and transmit torque to the driving wheels of the vehicle. The various gears and other components of such mechanisms must be cooled and lubricated at all times during the mechanism's operation by an adequate flow of oil and typically such flow is accomplished by sealing the rotating carrier of the differential within a housing partially filled with oil so that the rotation of the carrier may be employed to circulate the oil. The design of such lubrication systems usually takes one of two forms depending upon the intended use of the differential and therefore upon the expected normal rotative speed of the differential carrier. If the carrier is to be normally operated at relatively high rotative speeds it is common to supply oil to the carrier near its axis of rotation so that centrifugal forces may be utilized to urge the oil to flow radially outward through passages in the carrier directing the oil to the carrier's internal components, but if the carrier is to be normally operated at relatively low rotative speeds it is common to provide scoops or cups around the carrier to lift oil upward as the carrier rotates so that it may drain radially inward by gravity through passages in the carrier directing the flow to the carrier's internal components. Since centrifugal forces urge oil to flow outwardly at high rotative speeds and gravitational forces urge oil to flow inwardly at low rotative speeds, a lubrication system designed for low speed operation will not provide an adequate supply of oil to the carrier's internal components when the carrier is operated at high speeds because oil cannot flow inwardly through the radial passages against the centrifugal forces which predominate at such speeds. Conversely, a lubrication system designed for high speed operation will not provide an adequate supply of oil to the carrier's internal components when the carrier is operated at a low speed because the centrifugal forces at such speeds are not sufficient to urge oil to flow radially outward through the carrier's lubricating passages. Further, if a differential carrier incorporates both the usual high and low speed lubrication systems the radial passages of the low speed system operate to bleed oil outwardly from the high speed system during high speed operation, and therefore an insufficient quantity of oil will be supplied to the carrier's internal components during high speed operation.

It is an object of the present invention to provide a lubrication system for a differential which provides an adequate supply of lubricating fluid to the internal components of the differential carrier regardless of the rotative speed at which the carrier operates.

SUMMARY OF THE INVENTION

In carrying out our invention in one preferred embodiment thereof, we provide a lubrication system for a differential carrier having an inner cavity and an axleway into the inner cavity along the carrier's axis of rotation. The lubrication system includes a first bore forming that portion of the axleway adjacent the carrier's inner cavity and fluid passages extending radially through the carrier to open into the axleway at a radius less than the radius of the first bore. Circumferentially spaced holding chambers are provided in the carrier which are open into the axleway and are connected by the first bore to the carrier's inner cavity, the radial fluid passages extending into the axleway angularly between these holding chambers and the chambers having an outer surface whose radius is greater than the radius of the first bore. A second bore having a radius less than the radius of the first bore forms that portion of the axle-way adjacent the exterior of the carrier and extends into the holding chambers to connect these chambers with the exterior.

DESCRIPTION OF PREFERRED EMBODIMENT

Figure 1:
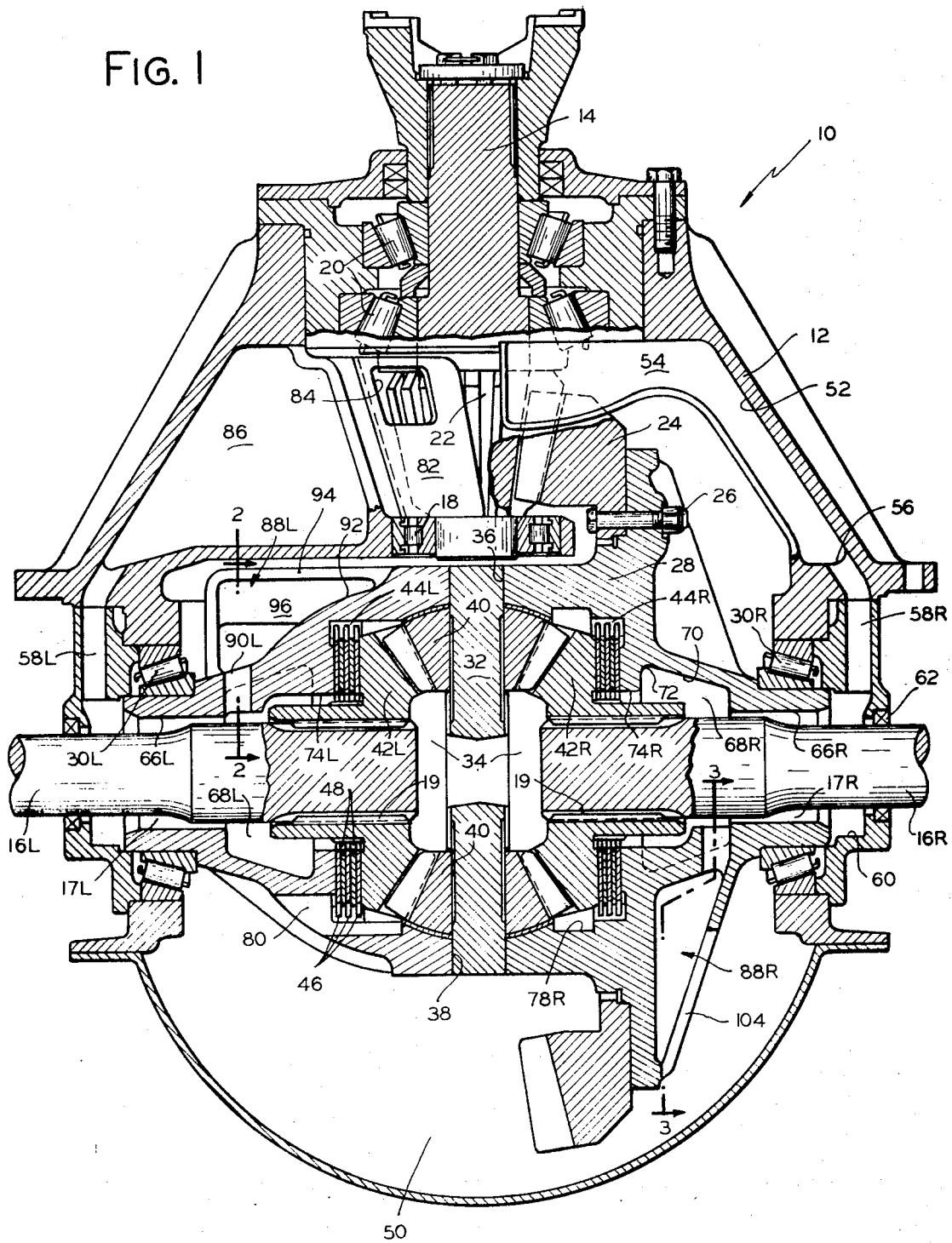
FIG. 1 illustrates a differential, partially in section, having a lubrication system in accordance with an embodiment of this invention.

Referring to FIG. 1, a differential mechanism embodying this invention is indicated generally by the numeral 10. A differential housing 12 contains the various components of the differential and provides openings for an input shaft 14 and a pair of coaxial drive axles 16L and 16R. Input shaft 14 is rotatably journaled within housing 12 upon a bearing 18 and a pair of thrust bearings 20, and a driving pinion gear 22 is splined for conjoint rotation with the input shaft. A ring gear 24 is driven by driving gear 22 and is connected, as by bolts 26, to rotate a differential carrier 28 about its axis of rotation defined by tapered thrust bearings 30L and 30R. Differential carrier 28 is hollow and generally closed and carries a cross 32 disposed diametrically across its inner cavity 34, the ends of cross 32 being received within diametrically opposed bores 36 and 38 formed in carrier 28 to fix the cross for rotation with the carrier. Each shaft of cross 32 carries a pair of planetary pinion gears 40 journaled radially outward near the opposite ends of the shafts and these planetary gears each engage both a side gear 42L and a side gear 42R to complete the differential gear train. Axles 16 extend into differential carrier 28 through axleways 17 formed in the carrier coaxial with its axis of rotation and the axles are splined at 19 for conjoint rotation with their respective side gear.

Differential 10 may also include means for resisting the free differential action of the mechanism to a limited extent so that some torque may be exerted by one drive axle even if the other axle is permitted to turn free. Such resisting means is provided by a clutch pack 44L associated with axle 16L and a similar clutch pack 44R associated with axle 16R, each clutch pack including a plurality of annular friction discs 46 splined to carrier 28 for rotation therewith that are interleaved with a plurality of annular friction discs 48 splined for rotation with their respective side gear 42. When axles 16L and 16R are operating at the same rotative speed there is no relative rotation between differential carrier 28 and either side gear 42L or 42R, and therefore no relative rotation between the interleaved friction discs of either clutch pack. However, if one axle 16L or 16R is permitted to turn more freely than the other, relative motion between its respective side gear 42 and carrier 28 must occur and this relative motion will be resisted by the friction discs of both clutch packs 44. The torque of this clutch pack resistance, in its equal but opposite reactive form, will be available to the axle 16R or 16L which is still capable of utilizing such torque.

A lubrication system is provided for differential 10 to insure the proper lubrication of the various moving components and to also provide means for dissipating heat. To this end, differential housing 12 is sealed and oil, or some other suitable lubricating fluid, is contained within the housing in sufficient quantity to form a pool or reservoir 50 of oil in the lower half of the housing into which carrier 28 and ring gear 24 may rotate during the operation of differential 10. Since the differential mechanism may be called upon to operate at both relatively high rotative speeds and relatively low rotative speeds, and further since the predominating forces upon the lubricating fluid are different for these two modes of operation (centrifugal forces predominating at high speeds and gravitational forces predominating at low speeds), the lubrication system includes both a high speed portion and a low speed portion. Although these two portions of the lubrication system operate in concert and include common elements they will be described separately for clarity.

As ring gear 24 rotates during high speed operation of differential 10 the surface of the ring gear is bathed in oil as it passes through lubricant reservoir 50. Surface tension causes a film of oil to cling to the surface of ring gear 24 as it rotates out of the lubricant reservoir and if the rotative speed of gear 24 is sufficiently high a portion of this oil film will be thrown radially outward from the gear by centrifugal force to impinge upon the inner wall 52 of differential housing 12 around its entire upper periphery. Some of the oil thrown from ring gear 24 will be collected by a gutter or trough or channel 54 which extends inwardly from housing inner wall 52 and slants downwardly toward axle 16R from above ring gear 24 so that the oil so collected will be urged by gravity to flow toward the inlet 56 of a passage 58R formed in housing 12 and forming a continuation of the channel 54. Passage 58R extends through differential housing 12 in a downward direction and the oil entering passage inlet 56 is urged by gravity to flow through the passage and fill a circumferential groove 60 formed in housing 12 to surround rotating axle 16R with oil. A wiper 62 prevents the loss of oil outwardly from differential housing 12 around axle 16R, but the axle increases in diameter inwardly from the vicinity of groove 60 toward side gear 42R and therefore oil is urged by centrifugal force to flow axially inward into axleway 17R through an annular space between axle 16R and a bore 66R in carrier 28 which forms the outer portion of axleway 17. A plurality of circumferentially spaced holding chambers 68R in differential carrier 28 open into axleway 17 to receive the oil from bore 66 and each holding chamber 68 is the outer portion of a sector of a truncated cone whose base is nearest inner cavity 34 so that high speed rotation of carrier 28 causes the oil in each chamber to flow to the chamber's outer surface 70 and pool near its maximum diameter located at 72. The radial "depth" to which oil may pool within chambers 68 is limited by the diameters of the various passages or openings into these chambers and oil will overflow out of the chambers into the passage with the greatest diameter since this passage will have the lowest effective "dam" height. The inner portion of axleway 17 is formed by a bore 74R in carrier 28 which extends from inner cavity 34 into chambers 68 and is of a diameter selected to be greater than the diameter of outer bore 66R so that oil supplied to chambers 68 through bore 66 overflows into a second annulus between bore 74R and side gear 42R. The interleaved friction discs of clutch packs 44 are provided with a number of radially orientated surface grooves (not shown) through which oil may flow outwardly under centrifugal force and these grooves are open at their inner end to bore 74R so that the oil overflowing chambers 68 may pass outwardly between discs 46 and 48 through these surface grooves to lubricate and cool the friction discs. The surface grooves of friction discs 46 and 48 are also opened at the discs' outer diameter to a circumferential groove 78R formed in carrier 28 so that oil existing in clutch pack 44R may be collected in groove 78R to lubricate the teeth of side gear 42R and pinion gears 40 and thereafter flood inner cavity 34 of the differential carrier with oil. Suitable openings, as indicated at 80, are provided in differential carrier 28 to permit oil to exit from inner cavity 34 and return to reservoir 50 after it has accomplished its work.

Axle 16L and its associated side gear 42L and clutch pack 44L are cooled and lubricated during high speed operation of differential 10 in a manner similar to that explained above for lubricating the corresponding components associated with axle 16R. As ring gear 24 rotates out of lubricant pool 50 a portion of the oil film which clings to the ring gear's surface is not thrown outwardly from the gear but is rather carried by ring gear 24 into its mesh with drive pinion 22, whereupon some of this oil is scraped from ring gear 24 on to the faster turning drive pinion 22. A partial cover plate or shield 82 conforming to the tapered shape of drive pinion 22 is supported from inner wall 52 of differential housing 12 and covers a substantial portion of the drive pinion's periphery so that oil thrown outwardly by centrifugal force from drive pinion 22 is collected upon the inner wall of shield 82. A window 84 is provided in shield 82 near its greatest diameter and the natural pumping action of drive pinion 22 urges the oil collected upon the inner wall of shield 82 to flow toward window 84 and outwardly therefrom. A second gutter or trough or channel 86, which is similar to trough 54 previously explained, extends inwardly from differential housing inner wall 52 and is located to receive or catch the oil discharged from window 84. Trough 86 slants downwardly toward axle 16L and funnels into a passage 58L in housing 12 similar to passage 58R previously explained so that oil within the trough is urged by gravity to flow through passage 58L and surround axle 16L with oil. Axle-way 17L is formed by elements allochirally similar to those forming axleway 17R and therefore oil is urged to pass inwardly through the axleway in the manner previously explained to cool and lubricate clutch pack 44L and side gear 42L.

Figure 2:
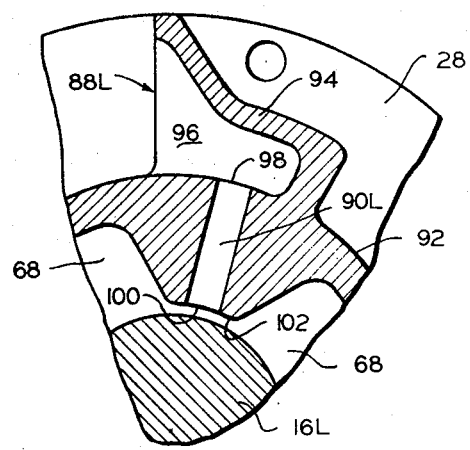
FIG. 2 is an enlarged sectional view along line 2—2 of FIG. 1 and showing to advantage a portion of the lubrication system.

During the operation of differential 10 at relatively low rotative speed, the peripheral velocity of ring gear 24 and drive pinion 22 are not sufficient to throw any quantity of oil outwardly therefrom and therefore troughs 54 and 86 do not receive sufficient oil for the differential's lubrication in the manner previously explained. In order to lubricate the components associated with axle 16L during such low speed operation a plurality of oppositely orientated dippers or cups, such as cup 88L, are formed around carrier 28 to rotate downward into lubricant reservoir 50, fill with oil, and lift such oil upward so that it may "drain" by gravity through passages 90L on to axle 16L. Referring to FIG. 2 in conjunction with FIG. 1, differential carrier outer surface 92 cooperates with a wall 94 extending radially from the outer surface and then turning circumferentially to form a bowl 96 which may fill with oil when cup 88L is dipped into lubricant reservoir 50. As cup 88L rotates upward out of the reservoir an amount of oil is lifted within bowl 96 above a horizontal plane and is thereafter urged by gravity to enter passage 90L through its inlet 98 located near the bowl's bottom." Passage 90 extends inwardly through carrier 28 angularly between holding chambers 68 in substantially a radial direction and opens at its radially inner end 100 into a bore 102 which forms a part of axleway 17L and is coaxial with axle 16L so that oil from the cup may drain directly on to the axle. After draining on to the top of axle 16 the lubricating oil flows downwardly around the axle and inwardly through bore 74L (FIG. 1) to lubricate clutch pack 44L and side gear 42L by gravity flow through the grooves and passages previously explained.

Figure 3:
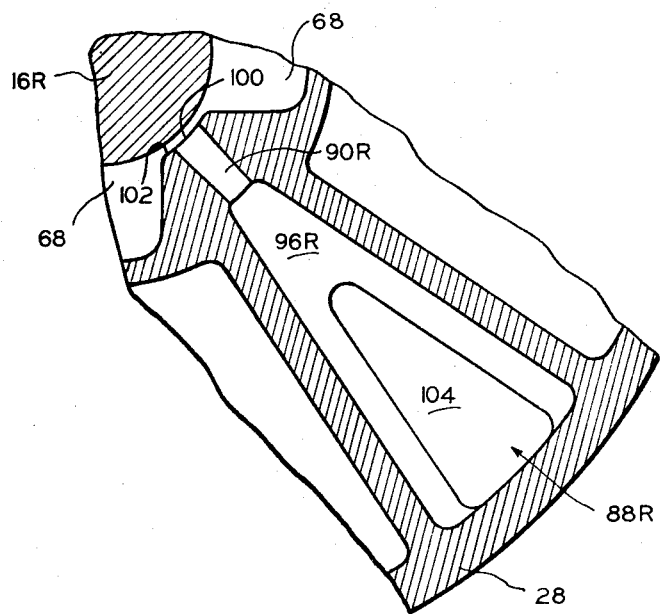
FIG. 3 is an enlarged section view along line 3—3 of FIG. 1 and showing to advantage another portion of the lubrication system.

Low speed lubrication and cooling of axle 16R, clutch pack 44R, and side gear 42R is accomplished in a manner similar to that explained above for low speed lubrication of the corresponding components associated with axle 16L. Referring to FIG. 3 in conjunction with FIG. 1, a plurality of cups, such as cup 88R, are formed in carrier 28 around ring gear 24. An opening 104 in the side of ring gear 24 permits oil to flow into bowl 96R of cup 88R when the cup is dipped into lubricant reservoir 50 and a passage 90R, similar to passage 90L, opens into bowl 96R near its bottom. Passage 90R extends inwardly through carrier 28 angularly between holding chambers 68 in substantially a radial direction and opens at its radially inner end 100 into a bore 102 which forms a part of axleway 17 and is coaxial with axle 16R so that oil may drain directly on to the axle when cup 88R is lifted above a horizontal plane. After draining on to the top of axle 16R the lubricating oil flows downwardly around the axle and inwardly through bore 74R (FIG. 1) to lubricate clutch pack 44R and side gear 42R by gravity flow through the grooves and passages previously explained.

Passages 90 are open at their inner ends 100 into axleways 17 and, because centrifugal force urges oil to flow outwardly through these passages during high speed operation of differential 10, the passages could permit oil to drain from chambers 68 without flowing inward through bore 74 for the desired lubrication of clutch packs 44 and side gears 42. In order to prevent such a loss of lubrication during the differential's high speed operation the radii of passage inner ends 100 are selected to be less than the radius of bore 74 so that as oil enters holding chambers 68 and pools around the chamber's outer surface 70 it will overflow into bore 74 before its radial depth is sufficient to permit the oil to be thrown outwardly through passages 90. The radii of passage inner ends 100 may further be a selected incremental amount less than the radius of bore 74 so that the quantity of oil supplied through bore 74 may be regulated by the radial "standpipe" effect of passage 90 which operates to limit the hydraulic head presented to bore 74 during high speed operation.

While we have described and illustrated herein one preferred embodiment of our invention, it will be appreciated that modifications may be made therein which fall within the spirit and scope of our invention.

We claim:

1. A lubrication system for a differential having a housing defining a reservoir for oil, and having rotating gearing with internal spaces including elements to be lubricated, the gearing also having axleways leading from the internal spaces axially outwardly and terminating in the housing, axles in the axleways and dimensioned for forming passages therearound in the axleways, the gearing including at least one member of sufficiently great diameter to extend into the oil in the reservoir, said lubrication system comprising, in combination, means forming channels receiving oil thrown by centrifugal force at high speeds from said one member, operative for directing it to the axially outer ends of the said axleways and continuously so directing it so that sufficient pressure is developed in the oil to force it axially inwardly through the axleways into the internal spaces, and said one member having cups with radially outer portions open to the interior of the housing and positioned for receiving oil from the reservoir when the cups are lowermost, and radially inner portions generally closed to the interior of the housing and capable of carrying oil upwardly on rotation of said one member, said one member also having generally radial gravity passages from the closed inner portions of the cups to the axleways operative for conducting oil from the cups to the axleways when the cups are uppermost and the oil flows downwardly by gravity, at low speeds, said internal spaces extending radially outwardly beyond the radially inner ends of the gravity passages, whereby oil will flow by gravity from the axleways into the lower portions of said internal spaces.

2. A lubrication system according to claim 1 wherein said axleways include portions leading into said internal spaces that are positioned radially outwardly beyond the radially inner ends of the gravity passages, whereby at high speeds oil is thrown by centrifugal force through said portions of the axleways to the exclusion of forcing it radially outwardly through said gravity passages.

3. A lubrication system according to claim 1 wherein the axles increase in diameter proceeding in axially inward directions, tending to increase centrifugal force action on the oil and thereby increasing the pressure forcing the oil axially inwardly toward the internal spaces.

4. A lubrication system according to claim 3 wherein the axleways include at least portions leading into the internal spaces that are disposed at progressively greater radial distances than the axially outer ends of the axleways, whereby to increase centrifugal force in positions progressively axially inwardly in the axleways.

5. A lubrication system according to claim 4 wherein the gearing includes spaces co-axial with and forming portions of the axleways that are in the shape of truncated cones with large bases directed axially inwardly toward said internal spaces.

6. A lubrication system according to claim 1 wherein said axleways terminate axially outwardly adjacent the sides of the housing, said channels are defined partially by the inner surface of the housing, and the channels continue along the housing to the axially outer ends of the axleways.

7. A lubrication system according to claim 1 wherein said one member includes a ring gear, and the ring gear throws oil by centrifugal force into said channels on one side of the housing and into the corresponding axleway.

8. A lubrication system according to claim 7 wherein the gearing includes a driving pinion gear in mesh with the ring gear, and the pinion gear throws oil by centrifugal force into said channels on the side of the housing opposite that into which oil is thrown by the ring gear.

9. A lubrication system for a differential having a housing defining a reservoir for oil, an having rotating gearing, the gearing including a ring gear and a carrier therefor, the ring gear geing dimensioned for entering into oil in the reservoir, the ring gear carrier defining a central cavity and axleways leading therefrom outwardly to adjacent the sides of the housing, the gearing including opposed side gears in the cavity, and axles in the axleways connected with the side gears for rotation therewith, the gearing additionally including pinion gears in the cavity in mesh with the side gears, the carrier and side gears being dimensioned for defining an annular space between the carrier and each side gear, and the gearing including a clutch pack in each of those annular spaces, the lubrication system comprising, in combination, means forming channels positioned for receiving oil thrown by centrifugal force by the ring gear at high speeds and conducting it to the axially outer ends of the axleways, whereby pressure develops for forcing the oil axially inwardly through the axleways, the axleways communicating with said annular spaces and effective for conducting oil into those annular spaces whereby the oil flows by centrifugal force radially outwardly in those annular spaces through the clutch packs, the carrier having circumferential grooves receiving oil from said annular spaces and conducting it to the meshing areas between the pinion gears and the side gears and into a central space in the cavity, the gearing also including passages from said central space to the reservoir, the ring gear carrier further including cups positioned for entering into oil in the reservoir and operative at low speeds for picking up oil and carrying it up and emptying it whereby the oil flows by gravity into said annular spaces and onto the clutch packs therein, and into the said meshing areas.

10. A lubrication system according to claim 9 wherein said circumferential grooves are of such axial extent as to encompass substantially all of said annular spaces and said meshing areas.

11. A lubrication system according to claim 9 wherein the housing includes opposite side portions and means in those portions forming bearings for opposite ends of said carrier, said channels follow along the inner surfaces of the housing and through said side portions of the housing and into the axleways at the inner surfaces of the housing defined by said side portions.

12. In a differential having a stationary housing defining a reservoir for oil, and including gearing in the housing capable of being rotated at low speed, the gearing having internal spaces and elements in those spaces to be lubricated, the gearing including a ring gear and carrier therefor, a lubrication system comprising, structure in the carrier defining cups each having a radially outer open end, and wall elements at its radially inner end forming a bowl, the structure further having a passage leading radially inwardly from each bowl to the internal spaces, the cups being positioned radially outwardly sufficiently that at least the outer open ends thereof extend into the oil in the reservoir when the cups are directed downwardly, the cups being operative, at low speed of rotation of the carrier, for picking up oil from the reservoir and, as the cups progress upwardly from downward position toward horizontal position, for holding oil in the bowls and, as they progress further and said passages pass above the horizontal, the oil in the bowls flows through the passages into said internal spaces.

13. A lubrication system according to claim 12 wherein the internal spaces and the elements therein include portions distributed angularly around the central axis of rotation, and further wherein the cups are also distributed angularly around that axis.

* * * * *